United States Patent [19]

Ejiri et al.

[11] 4,366,506
[45] Dec. 28, 1982

[54] PICTURE TRANSFER METHOD AND APPARATUS THEREFOR

[75] Inventors: Koichi Ejiri, Chiba; Morisumi Kurose, Yokohama; Mamoru Maeda, Tokyo, all of Japan

[73] Assignee: Kabushiki Kaisha Ricoh, Tokyo, Japan

[21] Appl. No.: 271,239

[22] Filed: Jun. 8, 1981

Related U.S. Application Data

[63] Continuation-in-part of Ser. No. 33,977, Apr. 27, 1979.

[30] Foreign Application Priority Data

May 18, 1978 [JP] Japan ................................. 53-58236

[51] Int. Cl.³ ............................................. H04N 7/12
[52] U.S. Cl. .................................... 358/260; 358/133; 358/280
[58] Field of Search ............... 358/133, 138, 260, 263, 358/280, 284

[56] References Cited

U.S. PATENT DOCUMENTS

| | | | |
|---|---|---|---|
| 3,414,677 | 12/1968 | Quinlan | 358/138 |
| 3,700,797 | 10/1972 | Wernikoff | 358/280 |
| 3,849,592 | 11/1974 | Rosenheck | 358/260 |
| 4,084,196 | 4/1978 | Tisue et al. | 358/280 |
| 4,124,870 | 11/1978 | Schatz et al. | 358/260 |

OTHER PUBLICATIONS

Machol-Pseudo –Halftone for Representing Continuous Tone Images in Black–White Facsimile Systems-IBM Tech. Discl. Bull., vol. 9#6 Nov. 1966, pp. 636-637.

*Primary Examiner*—Joseph A. Orsino, Jr.
*Attorney, Agent, or Firm*—Oblon, Fisher, Spivak, McClelland & Maier

[57] ABSTRACT

A system for sampling binary value images of white and black and efficiently encoding and decoding them is disclosed. An image is sampled to form a plurality of small picture cells. The small picture cells are merged in groups of four to form a plurality of large picture cells. At least one least frequently occurring density level is determined for the plurality of large picture cells. The least frequently occurring density level is converted to an adjacent density level. The density levels for the picture cells are then encoded and transmitted to a receiver. At the receiving end, the encoded large picture cells are decoded to form a plurality of restored large picture cells. Each restored large picture cell is divided into four small restored picture cells by comparing its density level with that of four neighboring large restored picture cells.

2 Claims, 9 Drawing Figures

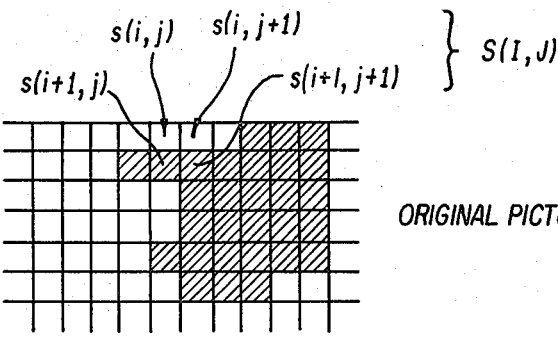
FIG. 1(a) ORIGINAL PICTURE
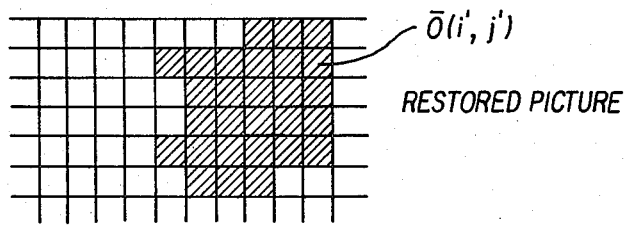
FIG. 1(b) DENSITY DISTRIBUTION OF LARGE PICTURE CELLS AFTER OPERATION
(TRANSMISSION BY 2 BIT UNITS)
FIG. 1(c) DENSITY DISTRIBUTION AFTER RECEIVING
FIG. 1(d) RESTORED PICTURE

LINE 1

```
          | 0 | 1 | 2 | 3 | 4 |----
          |   |(0)|   |   |   |
CODE: 11----1  011 |00  11 |01 |10 |11  10|
      ⎵⎵⎵⎵⎵   ⎵⎵⎵  ⎵⎵ ⎵⎵              ⎵⎵
      11-BITS  FL  LEVEL RUN            RUN
      LINE FEED    0  LENGTH         LENGTH
                      2
```

LINE 2

```
          | 0  0 | 2 | 4   4 |----
CODE: 11----1  011 |00  11 |01 | 11   11 |
      ⎵⎵⎵⎵⎵   ⎵⎵⎵  ⎵⎵ ⎵⎵      ⎵⎵  ⎵⎵
      11-BITS  FL  LEVEL RUN   LEVEL RUN
                   | 0  LENGTH   4  LENGTH
```

LINE 3

```
          | 0  0 | 3 | 4 | 2 |----
CODE: 11----1  001 |00  11 |10 |1110 |01 |
      ⎵⎵⎵⎵⎵   ⎵⎵⎵
      11-BITS  FL
```

| | INPUT PICTURE CELL | | | | | ROM CODE OUTPUT PICTURE CELL | | | |
|---|---|---|---|---|---|---|---|---|---|
| | | UP | DOWN | LEFT | RIGHT | | | | |
| S'(I,J) | S'(I,J-1) | S'(I,JH) | S'(I-1,J) | S'(I+1,J) | | O₁ | O₂ | O₃ | O₄ |
| φ(000) | X | X | X | X | | 0 | 0 | 0 | 0 |
| 4(100) | X | X | X | X | | 1 | 1 | 1 | 1 |
| 1(001) | 3 | 1 | 2 | 0 | | — | — | — | — |
| 1(001) | 0 | 0 | 0 | 0 | | 0 | 0 | 0 | 0 |
| 2(010) | 2 | 1 | 1 | 1 | | — | — | — | — |
| 3(011) | 0 | 3 | 2 | 3 | | 0 | — | 0 | 0 |

φ(000) ← DENSITY LEVEL, BINARY CODE EXPRESSION

X — MAY BE ANY VALUE

PICTURE TRANSFER METHOD AND APPARATUS THEREFOR

CROSS REFERENCE TO RELATED APPLICATIONS

This application is a continuation-in-part of U.S. application Ser. No. 033,977 filed Apr. 27, 1979.

BACKGROUND OF THE INVENTION

1. Field of the Invention

The present invention relates to a system for sampling binary value images of white and black and efficiently encoding and decoding them.

2. Description of the Prior Art

In an apparatus for sampling and reproducing an image (or a picture) on the basis of picture cells, it is known that the quality of a reproduced image depends on the following characteristics. (T. S. Huang, "PCM Picture Transmission", IEEE Spectrum, 12, 57-63 (1965)). That is, for improving the quality of an image having a lot of high space frequency components such as a document, it is necessary to increase the number of picture cells per unit area. However, in order to increase the number (or density) of picture cells, the sampling density of an image sensor must be increased and concurrently the transmission rate of image information and the density of picture cells in a reproducing apparatus must be increased. As a result, the cost of an image input and output apparatus having high image quality must inevitably be increased.

Generally speaking, a document image consists of only white and black portions and it is well known that there is a strong correlation between its image portions. The modified Huffman method adopted by CCITT as an image transmission encoding method makes use of this correlation.

It has been proposed by Nishikawa et al to reproduce white and black picture cells of high density from coarse sampled picture cells through the density information of their surrounding picture cells by utilizing the above mentioned correlation. (A Method For Reproducing An Image By A Solid Image Sensor, 1977, DENSHITSUSHINGAKUKAI General meeting 1011). This method divides a picture cell into four small picture cells by utilizing its surrounding eight picture cells to thereby obtain an image of high quality.

The object of the present invention is to provide a more efficient technique for a facsimile apparatus of high quality by utilizing the characteristics of a document image. That is, the conventional encoding method adopts a procedure of placing a plurality of white and black picture information in picture cell units side by side and encoding them en bloc. However, this prior art method utilizes an encoding method which considers statistical properties of an image. So, there is a defect to the effect that encoding efficiencies are quite different in the case of sentences using different characters such as alphanumerical sentences and Chinese character sentences.

SUMMARY OF THE INVENTION

Accordingly, one object of the present invention is to provide a novel method and apparatus for encoding an image comprising white and black portions with high efficiency and for restoring an image of high quality from the encoded image. In the following, the present invention will be described in connection with its application to a facsimile apparatus.

It is assumed that an image is sampled on the basis of picture cells which are expressed by binary values of white (0) and black (1). FIG. 1 illustrates a series of signal operations in accordance with the present invention. That is, FIG. 1(a) illustrates the density level of each picture cell s(i,j) in a sampled binary image. When making a large picture cell S(I,J) by combining these four picture cells, FIG. 1(b) is obtained. The numerical values of 0 to 4 in FIG. 1(b) denote respectively the density level of each large picture cell. For example, 0 denotes white, 4 denotes black, and 1 to 3 denote respectively the density level (or a grade of density) of each large picture cell. The least frequently occurring density level of the large picture cells shown in FIG. 1(b) is the level 1. This least frequently occurring level is deemed to be the same as that of a neighboring density level. That is, level 1 is encoded and transmitted as level 0. As there is no level 1 appearing at the receiving side, the density levels of each large picture cell as seen in FIG. 1(c) are decoded. Each decoded large picture cell is divided into four small picture cells in accordance with the procedures described hereinafter using the correlation of its surrounding four small picture cells and the white or black density of each small picture cell is thus determined. FIG. 1(d) denotes an example of such a reproduced image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1(a) through 1(d) are diagrams illustrating a series of signal operating processes;

FIG. 3 is a diagram illustrating an example of the code of the present invention;

FIG. 4(c) illustrates a conversion code stored in Read Only Memory ROM(CV) shown in the approximate restoration circuit of FIG. 4(b).

DESCRIPTION OF THE PREFERRED EMBODIMENTS

Figure 2:
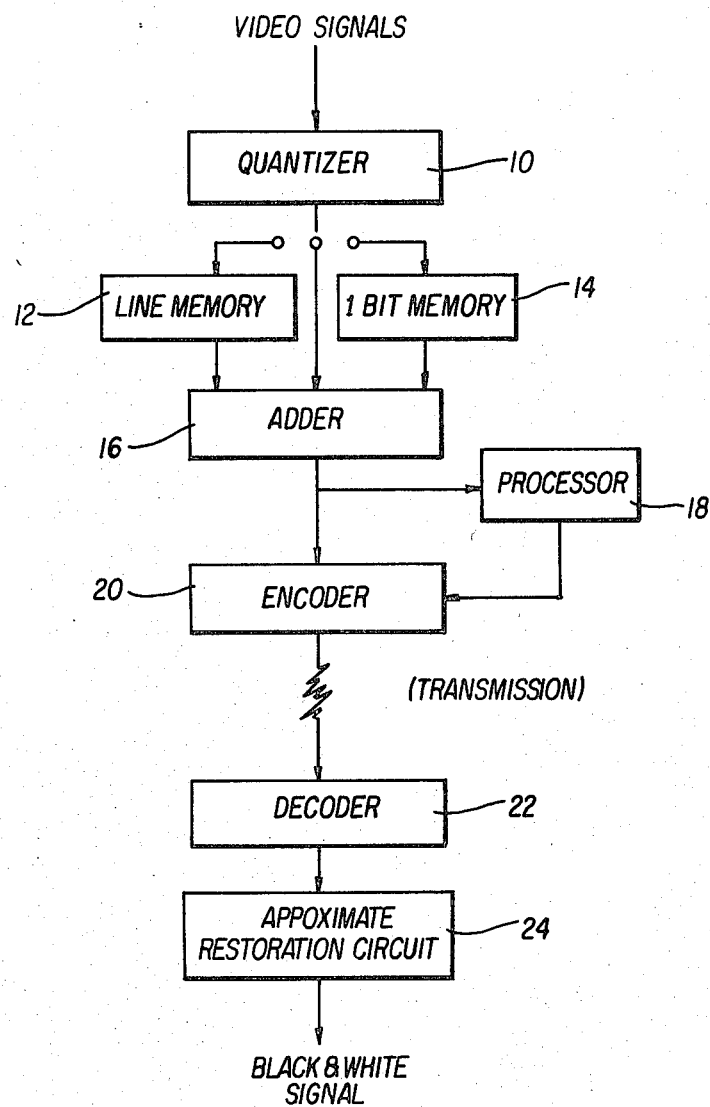
FIG. 2 is a block diagram illustrating a circuit of the present invention.

Referring now to the drawings, wherein like reference numerals designate identical or corresponding parts throughout the several views, and more particularly to FIG. 2 thereof, wherein a preferred embodiment according to the present invention illustrates a system for sampling binary value images of white and black and efficiently encoding and decoding them.

Images are sampled or read out as white (hereinafter denoted by 0) or black (hereinafter denoted by 1) for each picture cell. Video signals seen in FIG. 1(a) denote analog density signals obtained when the current image was sampled by an image sensor such as a charge coupled device (CCD). Hereinafter, when expressing a density signal by a numerical value, a larger numerical value denotes a higher density level and a numerical value nearer 0 denotes a density level nearer white. Thus, a density level nearer white denotes a lower density level. This video signal is divided into white and black states through a quantizer 10. The most popular quantizer consists of a peak hold circuit and a comparator. This method is most widely used in a circuit wherein the output signal of a peak hold circuit having a sufficiently short rising response time and a sufficiently long falling response time for a white peak is compared with an original video signal to produce a logic 1 output when the density of the video signal is larger than that of output signal and to produce a logic 0 output if this condition is not met.

The output of the quantizer corresponds to FIG. 1(a).

Next, the quantized picture cells are temporarily stored in a line memory 12 if the current scanning line is an odd number. If the current scanning line is an even number, the quantized picture cells are temporarily stored in a 1 bit memory 14 when the main scanning address j is an odd number. When the address j is an even number, the addresses j−1 and j are read from the line memory and the address j−1 is read from the 1 bit memory. The thus read information is supplied to an adder 16 along with the information at the main scanning address j where the sum of the densities of four surrounding picture cells is determined. The output of the adder is a signal S(I,J), where $$I = \left[\frac{i+1}{2}\right], J = \left[\frac{j+1}{2}\right] \text{ and } [x]$$

denotes a largest integer not exceeding x. As the output state S(I,J) of the adder is the summation of four sampled picture cells, s(i,j), s(i,j+1), s(i+j,j), and s(i+1,j+1), the density level may take any one of five states of 0 to 4. FIG. 1(b) illustrates the quantized original picture of FIG. 1(a) after summation by the adder.

Next, the least frequently occurring density level of the large picture cells S(I,J) are counted with a processor 18. The algorithm for obtaining the least frequently occurring level is as follows. First, the contents Ns of a memory in the processor 18 having the value of S(I,J) as its address is read out (or sampled). The initial value of Ns is naturally 0. Next, 1 is added to the value of Ns and the result is stored again in the address S(I,J). By continuing such a series of operations, the frequency of occurrences of the densities of the large picture cells in the past are stored in each of the addresses 0 to 4 of the memory of the processor. Therefore, when the values of each of the addresses 0 to 4 of the memory are successively read out and these values are compared with each other, the lowest value among them is easily determined. By repeating this operation, a plurality of times, any frequency of occurrence may be obtained in an increasing order. The density level $F_L$ of the lowest value is the least frequently occurring level $F_L$.

It is sufficient that the calculation of this least frequently occurring level be effected once for each two scanning lines. In a conventional facsimile system, this may be effected once per 128×2 picture cells. Such an operation need not be effected at high speed and thus a commercially available micro-computer (CPU) may be used. Further, when the scanning line I is 1, the least frequently occurring level cannot be obtained. So, conventionally any desired number may be adopted from 1 successively. In the example of FIG. 1(b), only the least frequently occurring level is replaced by another level.

The next operational block of the system is an encoder section 20 for effecting the encoding of the large picture cells with the information of the least frequently occurring level and the large picture cell information S(I,J).

For faithfully encoding the density levels 0 to 4 of the large picture cells, the density level cannot be expressed by codes of less than 2 bits. For example, levels 0, 1, 2, 3 and 4 must be respectively expressed by 2 bits and 3 bits such as 00, 01, 10, 110 and 111. While, according to our experience the rate of contribution of any density level to an image quality is smaller for smaller frequencies of occurrence. Therefore, if the least frequently occurring level is replaced with any other level, effective encoding may be effected with little detriment to the image quality. In the example of FIG. 1(b), level 1 is the least frequently occurring level. So, the replacement of level 1 by level 0 enables the density levels to be expressed by two bits. If the occurring frequencies of each density level are substantially same, the efficiency of encoding is elevated by $$\left(\frac{1}{5} \times 2 \times 3 + \frac{1}{5} \times 3 \times 2\right) -$$

$$\left(\frac{2}{5} \times 2 + \frac{1}{5} \times 2 \times 3\right) = \frac{1}{5}$$

bit for one picture cell.

The particular encoding algorithm is as follows:

Assume that the detection of the frequency of occurrence levels is effected once for each two scanning lines. In accordance with a preferred embodiment, assume that the least frequently occurring levels are adopted as low frequency levels and the other levels are replaced as seen in Table 1 according to the detected least frequently occurring level.

TABLE 1

| Least Frequently Occurring Level | Regulation of Level Replacement |
|---|---|
| 0 | 0 → 0, 1 → 0, 2 → 2, 3 → 3, 4 → 4 |
| 1 | 0 → 0, 1 → 0, 2 → 2, 3 → 3, 4 → 4 |
| 2 | 0 → 0, 1 → 1, 2 → 3, 3 → 3, 4 → 4 |
| 3 | 0 → 0, 1 → 1, 2 → 2, 3 → 4, 4 → 4 |
| 4 | 0 → 0, 1 → 1, 2 → 2, 3 → 4, 4 → 4 |

Immediately after the encoder has generated a line feed signal 111 . . . 1 (eleven bits), the least frequently occurring level counted by the processor is encoded in accordance with Table 2.

TABLE 2

| Least Frequently Occurring Level | Code |
|---|---|
| 0 | 000 |
| 1 | 001 |
| 2 | 010 |
| 3 | 011 |
| 4 | 100 |

In succession the density levels replaced by Table 1 are given the 2 bit code seen in Table 3.

TABLE 3

| Least Frequently Occurring Level | Density Level Codes (2 Bits) |
|---|---|
| 0 | (0,1) → "00", 2 → "01", 3 → "10", 4 → 11 |
| 1 | (0,1) → "00", 2 → "01", 3 → "10", 4 → 11 |
| 2 | 0 → "00", 1 → "01", (2,3) → "10", 4 → "11" |
| 3 | 0 → "00", 1 → "01", 2 → "10", (3,4) → "11" |
| 4 | 0 → "00", 1 → "01", 2 → "10", (3,4) → "11" |

Further, only when the value of each replaced density level is 0 or 4, the run length of the level in encoded and follows the 2 bit code seen in Table 3.

Table 4 is the summary of the encoding scheme used by the encoder and Table 5 shows an example of the run length code.

TABLE 4

| Line Feed Signal | Lowest 1 Level Of frequency Distribution of Density Levels | Picture Information |
|---|---|---|
| 11 bits | 3 bits | (1) First 2 bits denote the density level of picture cells |
| | | (2) If 1 is 00 or 11, then the run length during which the density lasts shall be encoded in accordance with Table 5. |
| | | (3) If 1 is 01 or 10, it denotes the density and run length will not be used. |

TABLE 5

| Run Length | Code |
|---|---|
| 1 | 10 |
| 2 | 11 |
| 3 | 0100 |
| 4 | 0101 |
| 5 | 0110 |
| 6 | 0111 |
| 7 | 0010000 |
| 8 | 0010001 |
| 9 | 0010010 |
| 10 | 0010011 |

That is, at the beginning of each scanning line, a line feed signal "111 ... 1" (Eleven bits) is sent out. Following this, all the least frequency levels until the present time are sent out in 3 bits and the density levels of the large picture cells are encoded in accordance with Tables 3 and 4. The least frequently occurring levels are fixed in level 1 in the case of the first and second lines and are expressed by "001". Lines later than the second line express the least frequently occurring level up to a preceding line and are "010" when the least frequently occurring level is 2, and "011" when the least frequently occurring level is 3, and are "100" when the least frequently occurring level is 4 (Table 2).

FIG. 3 illustrates the coding of the example of FIG. 1(b). In line 1, the line feed signal "11 ... 1" (eleven bits) is sent out firstly and then the least frequently occurring level $F_L$ is expressed by 3 bits in accordance with the Table 2. Next, the density level S of the large picture cells is expressed by two bits in accordance with Table 3 and a run length code is added in accordance with Tables 4 and 5, if required.

Such an encoding may be easily realized with the value of $F_L$ given by a processor, the value of each density level S, the run length of the same density, and the code table (Table 5). If a particularly high speed is not required, any general purpose micro-computer may be used.

A decoder 22 at the receiving side effects the operations of the encoder 20 in a reverse order. The resulting decoded density levels are S'(I,J) which are applied to an approximate restoration circuit 24.

Figure 4A:
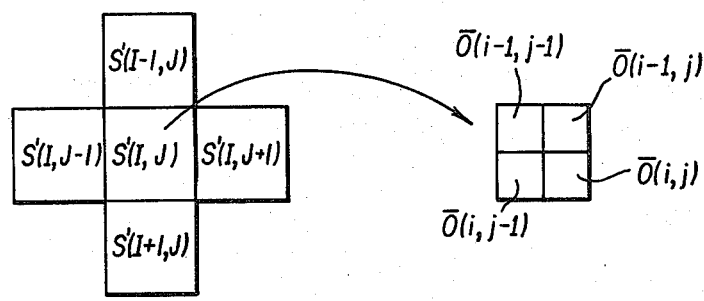
FIG. 4(a) illustrates a preferred embodiment of a method for dividing a large picture cell into four small picture cells according to the present invention.
Figure 4B:
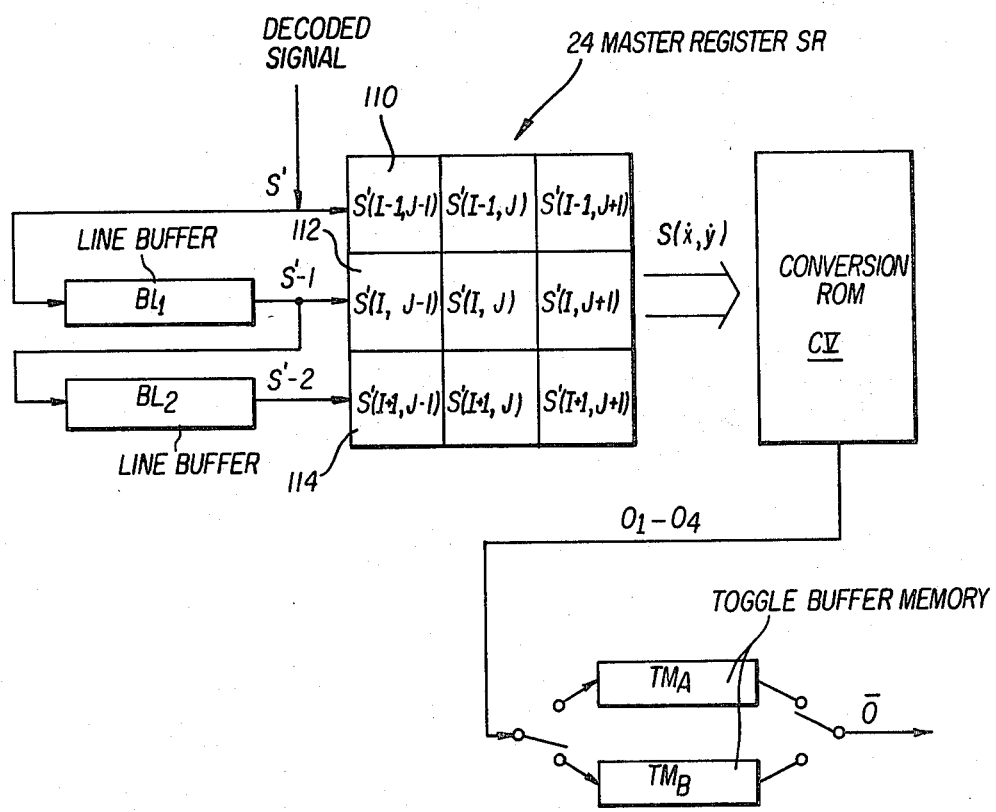
FIG. 4(b) is a block diagram illustrating a preferred embodiment of an approximate restorating circuit for dividing a large picture cell into four small picture cells by the method illustrated in FIG. 4(a)

FIG. 4(a) illustrates a method for dividing a large picture cell into four small restored picture cells according to the present invention and FIG. 4(b) illustrates an approximate restoration circuit 24 for performing this division by dividing a decoded level.

FIG. 1(d) illustrates an image restored in accordance with the following procedures.

The current picture cell S'(I,J) has any value of density (Levels 0 to 4) and the white (0) or black (1) levels of the reproduced small picture cells $\overline{O}$ (i−1, j−1), $\overline{O}$ (i−1, j), $\overline{O}$ (i, j−1), O (i,j) are determined in accordance with the following. Hereinafter, $\overline{O}$ (i−1, j−1) to $\overline{O}$ (i,j) shall be all expressed by $\overline{O}$ (k,l) as a whole; Wherein, i=2I, j=2J (See FIG. 4(a)).

(1) When the density level of the current picture cell S'(I,J) is between 0 and 4, the small picture cell $\overline{O}$ (k,l) is determined as follows in accordance with its value:

1-1 When S'(I,J)=0, all the small picture cells $\overline{O}$ (K,l); i.e., $\overline{O}$ (i,j), $\overline{O}$ (i−1,j), $\overline{O}$ (i,j−1), $\overline{O}$ (i−1,j−1) shall be all alloted white.

1-2 When S'(I,J)=4, all the small picture cells $\overline{O}$ (K,l) shall be alloted black.

1-3 When S'(I,J)=1, the following operation (2) shall be effected. When S'(I,J)=2, the following operation (3) shall be effected. When S'(I,J)=3, the following operation (4) shall be effected.

(2) As to the four large picture cells neighboring S'(I,J) (FIG. 4(a)):

2-1 When S'(I−1,J) is larger than S'(I+1,J) and S'(I,J−1) is larger than S'(I,J+1), $\overline{O}$ (i−1, j−1) shall be alloted black and all other small cells shall be alloted white.

2-2 When S'(I−1,J) is larger than S'(I+1,J) and S'(I,J−1) is not larger than S'(I,J+1), $\overline{O}$ (i−1,j) shall be alloted black and all other small cells shall be alloted white.

2-3 When S'(J+1,J) is not larger than S'(I+1,J) and S'(I,J−1) is larger than S'(I,J+1), $\overline{O}$(i,j−1) shall be alloted black and all other small cells shall be alloted white.

2-4 When S'(I−1,J) is not larger than S'(I+1,J) and S'(I,J−1) is not larger than S'(I,J+1), $\overline{O}$ (i,j) shall be alloted black and all other small cells shall be alloted white.

(3) Two small picture cells $\overline{O}$ (k,l), neighboring the large picture cell which has the largest density among the four large picture cells neighboring S'(I,J), shall be alloted black and all other small cells shall be alloted white. Herein, $\overline{O}$ (k,l) is a general name for the four small picture cells seen in FIG. 4(a).

(4) In the above mentioned operation (2), the operations shall be effected by interchanging black and white with each other.

FIG. 4(b) illustrates an example of an approximate restoration circuit 24 for performing the above discussed procedure.

In the approximate restoration circuit 24 of FIG. 4(b) the decoded picture cell signal S' is applied to an input of a register 110 which expresses S'(I−1,J−1). This register is a part of a master register SR having a 3×3 composition. The signal is also applied to a first line buffer BL$_1$ for obtaining a picture cell lagging by one line portion. The output (S'−1) of the first line buffer BL$_1$ is applied to an input of a register 112 of the master register SR which expresses picture cell S'(I,J−1) and is also applied to an input of a second line buffer BL$_2$ for obtaining a picture cell which further lags by one line portion. The output (S'−2) of the second line buffer BL$_2$ is applied to an input of a resister 114 expressing S'(I+1,J−1). The master register SR comprises a plurality of shift registers which can transmit data in a horizontal direction, i.e. in the direction shown by the arrows in FIG. 4(b).

Register outputs S'(I,J), S'(I−1,J), S'(I,J−1), S'(I,J+1), and S'(I+1,J) which express five picture cells among the outputs of the 3×3 master register SR are applied to an input of the Read Only Memory ROM(CV) for data conversion.

FIG. 4(c) illustrates an example of the conversion code stored in the ROM(CV). As can be seen from this figure, the ROM(CV) stores conversion data for any combination of all the levels of five picture cells. Generally this requires (5×3) or 15 bits. However, when S'(I,J) is 0 or 4, the result is clear and $\overline{O}$(k,l) is 0 or 1. So, the required number of bits may be reduced to 14 bits. The four restored picture cells (O$_1$, O$_2$, O$_3$ and O$_4$) appearing at the output of the ROM(CV) are applied to the inputs of toggle buffers TMA and TMB in an alternating fashion. Thus picture cell information is written into buffer TMA while buffer TMB is being read and vice versa. As to the order of reading the restored picture cells out of the toggle buffers, picture cells corresponding to O$_1$ and O$_2$ among the cells O$_1$ to O$_4$ which were obtained through one operation are read out successively for one line and then the cells corresponding to O$_3$ and O$_4$ are read out for the next line. Thereafter, the functions of the toggle buffers are exchanged and the next line of data is sent out. (O$_1$ O$_2$ O$_1$ O$_2$ ... O$_3$ O$_4$ O$_3$ O$_4$ ...)

In the above description, it is assumed that four small picture cells are expressed by one large picture cell and only the least frequently occurring density level is replaced by another level. However, if two least frequently occurring levels are neglected instead of one least frequently occurring level, then a further increase in the efficiency of encoding may be expected. Further, if sixteen small picture cells are combined and expressed by one large picture cell and n (1≦n<16) density levels from the lowest one are neglected, a further increase in the efficiency of encoding may be expected.

However, the approximate restoration method in such a case will be different from the above mentioned method. For example, it is proper in such a case to allot black from a small picture cell neighboring the large picture cell which has the largest density level among the large picture cells neighboring S'(I,J).

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A picture transfer method for analyzing a picture into picture cells, forming a plurality of large picture cells, reading out the densities of said picture cells, and restoring said picture therefrom, which comprises the steps of:

dividing said picture into a plurality of small picture cells;

quantizing the density of each of said plurality of small picture cells to obtain a binary density level for each picture cell;

forming a plurality of large picture cells from said plurality of small picture cells, each of said large picture cells being formed from four neighboring small picture cells;

determining the density level of each of said plurality of large picture cells by adding the binary density levels of the four small picture cells forming each large picture cell, said density level of each large picture cell being expressed as one of N gray levels;

determining one or a plurality of n least frequently occurring gray levels among said N gray levels of said large picture cells;

encoding said one or a plurality of n least frequently occurring levels;

compressing said N gray levels into (N−n) gray levels by converting said n least frequently occurring gray levels among said N gray levels into other gray levels among said N gray levels;

encoding said plurality of large picture cells utilizing said (N−n) gray levels;

transmitting said encoded n least frequently occurring gray levels and said plurality of large picture cells;

decoding said transmitted encoded n least frequently occurring gray levels and said plurality of large picture cells to produce a plurality of restored large picture cells having density levels expressed as (N−n) gray levels;

dividing each of said plurality of restored large picture cells into four small restored picture cells;

comparing the density level of each one of said plurality of restored large picture cells to the density levels of each of said plurality of restored large picture cells surrounding said each one of said plurality of restored large picture cells and assigning one of a white and black density level to each of four small restored picture cells contained in said each one of said restored large picture cells based on the result of said comparison.

2. A picture transfer apparatus for analyzing a picture into picture cells, transmitting signals representing the picture cells, and restoring a picture from those transmitted signals, which comprises:

means for forming a plurality of large picture cells through the merge of four picture cell signals denoting gray levels of a picture divided into a plurality of small picture cells, each of said plurality of large picture cells being assigned a gray level;

means for calculating a frequency of occurrence distribution of said gray levels of said plurality of large picture cells;

means for detecting a least frequently occurring one of said gray levels among said plurality of large picture cells;

means for encoding said least frequently occurring level;

means for shifting said least frequently occurring one of said gray levels into another one of said gray levels and for simultaneously producing a code of said least frequently occurring gray level;

transmitter means for encoding said least frequently occurring level and said gray levels other than said least frequently occurring gray level and for transmitting said encoded gray levels;

decoder means for decoding said least frequently occurring level and said transmitted encoded gray levels into restored gray level signals, each of said restored gray level signals being associated with one of a plurality of restored large picture cells; and means for dividing each one of said plurality of restored large picture cells into four small restored picture cells and for assigning one of a white and black density level to each of said restored small picture cells, said dividing means utilizing said restored gray level of said one of said plurality of restored large picture cells being divided and said restored gray levels of said restored large picture cells neighboring said one of said plurality of restored large picture cells.

* * * * *

UNITED STATES PATENT AND TRADEMARK OFFICE
CERTIFICATE OF CORRECTION

PATENT NO. : 4,366,506

DATED : December 28, 1982

INVENTOR(S) : KOICHI EJIRI ET AL

It is certified that error appears in the above-identified patent and that said Letters Patent are hereby corrected as shown below:

In column 5, line 46, delete "Eleven" and insert therefor --eleven--;

In column 6, line 1, delete "Table" and insert therefor --table--;

In column 6, line 16, delete "Levels" and insert therefor --levels--;

In column 6, line 45, delete "J+1" and insert therefor --I-1--;

Signed and Sealed this

Twenty-sixth Day of July 1983.

[SEAL]

Attest:

Attesting Officer

GERALD J. MOSSINGHOFF

Commissioner of Patents and Trademarks